United States Patent [19]

Ollis et al.

[11] Patent Number: 4,597,156

[45] Date of Patent: Jul. 1, 1986

[54] WIRE STRIPPING MACHINE

[75] Inventors: Frederick R. Ollis, Madison, Ohio; John N. Tengler, Chico, Calif.

[73] Assignee: Minnesota Mining and Manufacturing Company, St. Paul, Minn.

[21] Appl. No.: 537,956

[22] Filed: Sep. 30, 1983

Related U.S. Application Data

[62] Division of Ser. No. 97,036, Nov. 23, 1979.

[51] Int. Cl.[4] ........................ B23P 19/02; H02G 1/12

[52] U.S. Cl. .................................. 29/564.4; 29/566.1; 81/9.51

[58] Field of Search ................. 29/564.4, 564.7, 566.1, 29/566.3, 868; 81/9.51

[56] References Cited

U.S. PATENT DOCUMENTS

| | | | |
|---|---|---|---|
| Re. 26,791 | 2/1970 | Etchison, Jr. et al. | 29/566.3 |
| 1,733,294 | 10/1929 | Cross | 81/9.51 |
| 2,521,688 | 9/1950 | Cataldo et al. | 81/9.51 |
| 3,110,329 | 11/1963 | Lhomme et al. | 29/566.3 |
| 3,194,280 | 7/1965 | Mogestad et al. | 81/9.51 |
| 3,239,918 | 3/1966 | Cobaugh | 29/566.1 |
| 3,364,801 | 1/1968 | Johnston | 81/9.51 |
| 3,858,302 | 1/1975 | Abarotin | 29/564.4 |
| 4,020,548 | 5/1977 | Pohl | 81/9.51 |
| 4,152,826 | 5/1979 | Mueller | 29/868 X |
| 4,388,953 | 6/1983 | Hara et al. | 81/9.51 |

FOREIGN PATENT DOCUMENTS

| | | | |
|---|---|---|---|
| 52-36775 | 3/1977 | Japan | 81/9.51 |
| 832641 | 5/1981 | U.S.S.R. | 81/9.51 |
| 849575 | 7/1981 | U.S.S.R. | 29/566.1 |

*Primary Examiner*—William R. Briggs

*Attorney, Agent, or Firm*—Renner, Otto, Boisselle & Lyon

[57] ABSTRACT

A cable termination assembly has a staggered stripped cable insulation pattern to enhance the electrical isolation of plural ground isolation conductors from one or more signal conductors in the assembly, and a stepped crimp pattern at a juncture of the cable with a molded strain relief body provides an improved strain relief interaction therebetween. The cable termination assembly is made by removing the cable insulation in a pattern that exposes plural conductors while leaving an insulation portion covering part of one of the conductors to insulate the latter from the other conductors, and the exposed conductors are coupled to electrical contacts while the insulation portion left behind helps to assure the electrical isolation of the conductors from each other. The cable insulation is deformed to cause relatively raised and recessed portions in the same and a strain relief body is molded directly to the insulation with at least a portion of the molded strain relief substantially filling the space within at least one of the recessed portions. A machine prepares the cable for use in the cable termination assembly by partially removing insulation from such cable in a predetermined pattern and crimping the cable.

21 Claims, 20 Drawing Figures

WIRE STRIPPING MACHINE

This application is a division of copending U.S. patent application Ser. No. 097,036, filed Nov. 23, 1979.

BACKGROUND OF THE INVENTION

The present invention relates generally to cable termination assembly, a wire stripping apparatus to facilitate making such assembly and a method of making such assembly.

As is described in detail below, the cable termination assembly preferably is of the type in which plural conductors of a cable are terminated for electrical connection to another device, and typiclly such cable is of the flat type including, for example, three conductors in planar spaced apart relation in the cable insulation with the center conductor ordinarily carrying electrical signal information and the peripheral conductors providing ground signal isolation. However, although the following description will be directed primarily to the preferred embodiment and best mode of the invention in which the cable termination assembly is for a three conductor flat cable, it will be appreciated that the features of the invention may be employed in connection with other types of cable termination assemblies having more or fewer conductors in flat or other cable.

A cable termination assembly is a device for terminating a cable to provide electrical connection of the cable conductors to another device, such as another cable termination assembly, a terminal strip or board, etc. Such a cable termination assembly conventionally includes the cable, electrical contacts for connection with the cable conductors, and a strain relief mechanism. The contacts may be of the male or female type and usually in the latter case the assembly includes an electrically non-conductive cover or housing for guiding male pin contacts into engagement with respective female contacts in the assembly.

In prior cable termination assemblies for three conductor cables one conductor may carry signal information and the other two conductors may provide ground signal isolation.

It is the norm for cable termination assemblies to include a strain relief mechanism to prevent application of force to connections between conductor wires and electrical contacts in the assembly primarily when the assembly is removed from connection with another device. One type of known strain relief mechanism is that in which a strain relief body is molded directly to the cable to form substantially integral structure therewith while also preferably providing a hermetic seal about connections between the conductors and contacts, thereby helping to optimize the integrity of such electrical connections while also minimizing any chemical activity at such connections, especially when the electrically conductive materials are dissimilar.

Automated and semi-automated machines for stripping the insulation from conductors of a cable are known in the art. Typically, such machines uniformly strip the insulation from the end of a cable and fully remove the stripped insulation section completely exposing ends of the cable conductors for subsequent connection.

SUMMARY OF THE INVENTION

The fundamental features of the cable termination assembly in accordance with the present invention include the use of a staggered stripped cable insulation pattern to enhance the electrical isolation of the plural conductors in the assembly and in particular the preventing of short circuits between signal and ground conductors, and a stepped crimp pattern at a juncture of the cable with a molded strain relief body providing an improved strain relief interaction therebetween. Moreover, according to the method of the invention, a cable termination assembly is made by removing the cable insulation in a pattern that exposes plural conductors, usually the ground conductors, while leaving an insulation portion covering part of one of the conductors, usually the signal conductor, to insulate the latter from the other conductors, and the exposed conductors are coupled to electrical contacts while the insulation portion left behind helps to assure the electrical isolation of the conductors from each other. The method also includes deforming the cable insulation to cause relatively raised and recessed portions in the same and the molding of a strain relief body directly to the insulation with at least a portion of the molded strain relief substantially filling the space within at least one of the recessed portions. According to the invention a machine also is provided for preparing a cable for use in a cable termination assembly by partially removing insulation from such cable. Such machine preferably includes a slitter for slitting the insulation in a predetermined pattern, thus removing more insulation from one conductor and less insulation from another. The machine also may include a deforming means for crimping the cable and/or a puller means for pulling the cable a predetermined distance while an outlined insulation tab slit from the end of the cable is securely held.

With the foregoing in mind a principal object of the invention is to provide a cable termination assembly improved in the noted respects.

Another principal object is to provide an improved method for making a cable termination assembly.

An additional principal object is to provide an improved machine for preparing a cable for use in a cable termination assembly.

A further object is to minimize the space and materials requirement for a cable termination assembly in which plural cable conductors normally are maintained at the same signal level.

Still another object is to use an insulation finger at the stripped end of a cable for insulating conductors thereat.

Still an additional object is to use crimped raised and recessed portions of a cable as a means for centering the cable in a molding machine to assure substantial cable centering within a directly molded strain relief body.

Still a further object is to provide an improved strain relief for a cable termination assembly.

Even another object is to facilitate the making of a cable termination assembly and preferably to effect the same while assuring the integrity of electrical connections in the assembly.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

DESCRIPTION OF THE PREFERRED EMBODIMENTS

Figure 1:
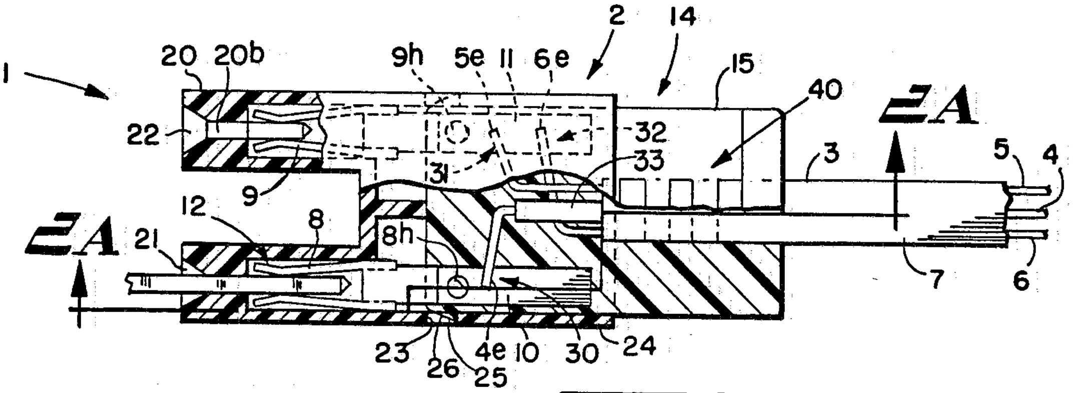
FIG. 1 is a top plan view, partly broken away in section, of a cable termination assembly in accordance with the invention.

Referring now in detail to the drawings, wherein like reference numerals designate like parts in the several figures, and initially to FIGS. 1–5, a cable termination assembly in accordance with the present invention is generally indicated at 1. Such assembly 1 includes a cable termination 2 which is attached to the end of a cable 3. The cable 3 preferably is of the flat, multiconductor type and in the preferred embodiment includes three conductors 4–6 running parallel to each other along the general directional extent of the cable while separated from each other by conventional electrical insulation 7. Preferably the conductor 4 is used to carry electrical signals, such as digital signals or the like, and will be referred to herinafter as the signal conductor, and the conductors 5, 6 provide ground, or other reference potential, signal isolation for the signal conductor and will be referred to hereinafter as the ground conductors. However, the cable may be other than flat and may include more or fewer than three conductors. The cable termination 2 includes plural electrical contacts, preferably two of them, 8, 9, having flat ends 10, 11 for connections with respective exposed ends 4*e*–6*e* of the cable conductors and connection ends 12, 13 for electrically connecting with another device, such as pin contacts or the like. The termination 2 also includes a strain relief 14, preferably formed by a strain relief body 15 molded directly to the cable 3, as shown, to form an integral structure with the latter while also preferably providing an airtight covering for the spot welded, soldered, or like connections between the exposed conductors ends 4*e*–6*e* and the contact ends 10, 11. Locking holes 8*h*, 9*h* in the contacts 8, 9 fill with material of the strain relief body 15 during molding of the latter securely to lock the contacts in the molded strain relief body.

Figure 3:
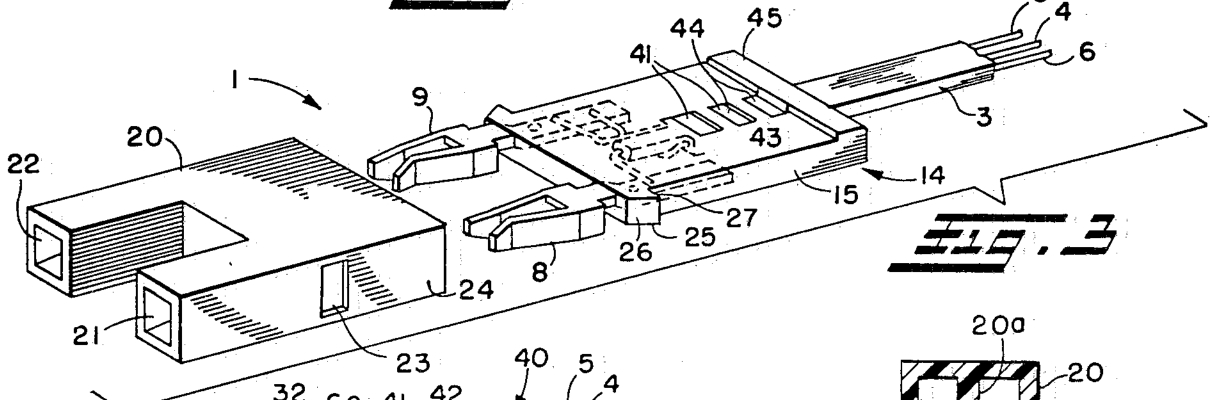
FIG. 3 is an exploded isometric view of the cable termination assembly of FIG. 1.

An electrically nonconductive cover or housing 20 may be slipped over the female contacts 8, 9 to guide male contacts through openings 21, 22 into engagement with such contacts. The housing 20 has a locking opening 23 in an edge wall 24 to receive a locking ramp 25, which is molded as part of the strain relief body 15. As seen in FIGS. 1 and 3, the sloped surface 26 of the locking ramp permits the strain relief body 15 to be inserted into the housing 20, and the stepped surface 27 cooperates with the housing wall at the locking opening 23 normally to prevent removal of the strain relief body from the housing.

Figure 2A:
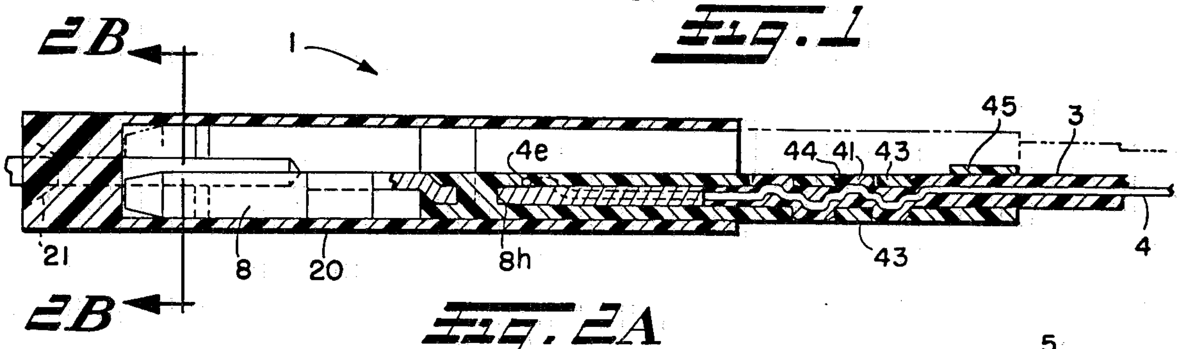
FIG. 2A is a side section view looking generally in the direction of the arrows 2—2 of FIG. 1.
Figure 2B:
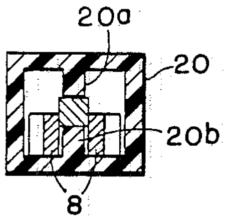
FIG. 2B is a partial section view looking generally in the direction of the arrows 2B—2B of FIG. 2A.

As is illustrated in FIGS. 2A, 2B and 3, the strain relief body 15 and the contacts 8, 9 at their connection ends 12, 13 have about the same thickness, i.e. looking vertically in FIG. 2A, which preferably is about half the total vertical clearance thickness provided for the same inside the housing 20. Therefore two terminating sets including contacts 8, 9 and a strain relief body 15 can be inserted in daisy chain fashion into a common housing as is seen particularly by the additional termination set shown in phantom lines in FIG. 2A. The contacts 8, 9 are of the female type and preload bars 20*a*, 20*b* in the housing 20 preload the contact tines slightly further open or apart than their normal unloaded relative position with the frictional forces between the tines and bars tending to help to hold the contacts and strain relief body in relatively fixed position. The bars 20*a*, 20*b* also provide a guiding and centering function for the pin contacts inserted into the housing to engage parts of the tines of one or two (if there are two terminating sets) contacts in the manner illustrated in FIG. 2B.

The signal conductor 4 is attached at a spot welded junction 30 to the contact 8, and both ground conductors 5, 6 are attached at spot welded junctions 31, 32 to the contact 9. Since the ground conductors 5, 6 are on opposite sides of the signal conductor 4 over the major extent of the cable 3 in order to provide effective ground isolation therefor, it is necessary for the signal conductor and one of the ground conductors to cross at the cable termination assembly 1. In particular, the exposed end 6*e* of ground conductor 6 crosses under the signal conductor 4. In accordance with the invention, an insulation finger 33 about part of the signal conductor 4 proximate its exposed end 4*e* assures effective electrical isolation between the crossing ground conductor exposed end 6*e* and the signal conductor.

Figure 4:
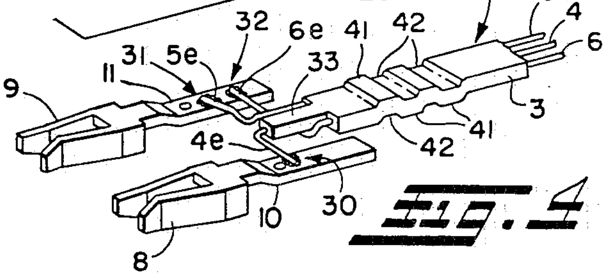
FIG. 4 is a fragmentary isometric view of the connected cable and contacts of the cable termination assembly.

A novel strain relief 14 is an important feature of the invention. Near the exposed conductor ends 4*e*–6*e*, the cable 3 is deformed or crimped to form therein several relatively raised and relatively recessed portions in a wave-like pattern 40, which is best seen in FIG. 4, flowing in the same direction as the cable; the raised cable portions 41 and the recessed portions 42, then, extend in a direction generally transverse to the directional extent of that portion of the cable in which they are formed. Preferably the patterns of raised and recessed portions on the opposite surfaces of the flat cable 3 are of opposite phase, i.e. there is a recessed portion 42 on the opposite side or surface of the cable 3 from a raised portion 41, and vice versa. The relatively raised and recessed cable portions provide a plurality of functions, as follows. During molding of the strain relief body 15 to the insulation 7, the raised portions 41 on both sides of the cable may engage opposite surfaces of the mold appropriately to locate or to center the cable in the mold and in the subsequently molded thereabout strain relief body 15. Otherwise, the cable may become positioned too close to one of the strain relief body surfaces during the molding process such that in the end product the cable could too easily be peeled from the strain relief body. Thus, the strain relief body 15 in the present invention may be relatively thin minimizing material and space requirements, while securely holding the cable 3 therein. Also, the recessed portions 42 provide a volume for receiving a quantity of the molding material during molding of the strain relief body 15 so that such molding material in effect forms a plurality of locking bars 43 located in such recesses securely holding the cable in the strain relief body. Moreover, the relatively raised portions 41 form insulation bars with surfaces 44 which directly confront or abut respective edges of the locking ribs or bars 43. The insulation surfaces 44 and the abutting edges of the locking bars 43 cooperate to transfer forces therebetween such that the area at which such forces are transferred has a substantial vector component extent that is generally perpendicular to the force direction thereby to provide high integrity to the mechanical interconnection between the cable and strain relief body even in the presence of relatively large forces applied in the major direction of the cable tending to separate the latter and the strain relief body. The recessed portions 42 further assure that material of the strain relief body 15 will pass across the cable 3 at both major surfaces thereof, and at the back end of the strain relief body 15 a relatively thick bar-like portion 45 (FIG. 3) may be molded as part of such body to maximize the amount of material surrounding the cable therebyto assure full coverage of the latter where it enters the strain relief body to prevent the possibility of a starting point there for a peeling separation between the cable and body.

Briefly, in accordance with the method of the present invention for making the cable termination assembly 1, the cable 3 is prepared; the exposed cable conductor ends are connected to the contacts; the strain relief body is molded about the cable and the junctions of the exposed conductor ends and contacts; and the housing 20, if used, is slipped over the contacts and strain relief body.

Figure 5A:
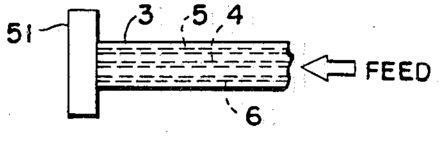
FIGS. 5A–5D are schematic illustrations of a method for preparing the cable for use in the cable termination assembly.
Figure 5C:
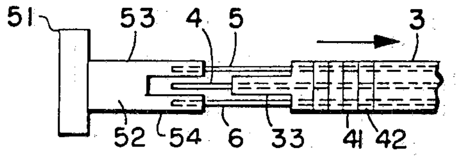
Figure 5B:
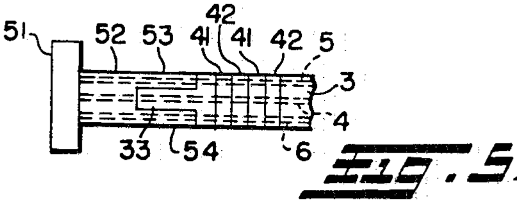

To prepare the cable it is necessary to strip insulation to expose the conductor ends, to crimp the cable or otherwise to deform the same to obtain the raised and recessed portions 41, 42 mentioned above, and to cross one of the ground and signal conductors. The steps for effecting such preparation are schematically illustrated in FIGS. 5A–5D. The steps illustrated in FIGS. 5A–5C may be carried out according to the machine operating steps schematically depicted in FIGS. 6A–6D utilizing the wire stripping apparatus 50, which is described in detail below. The cable 3 is fed into the apparatus 50 a predetermined distance established by an end stop wall 51 or is otherwise supplied ready for stripping, as is shown in FIG. 5A. In FIG. 5B the cable insulation 7 is slit according to a prescribed pattern preferably leaving an insulation finger 33 extending over the signal conductor 4 a longer distance than the insulation left remaining over the ground conductors 5, 6; the boundaries of a U-shape insulation tab 52 are accordingly established. The cable 3 also is deformed by crimping the same to establish the relatively raised and recessed portions 41,42. Turning to FIG. 5C, relative movement is effected between the tab 52 and the major extent of the cable 3 thereby to draw the ends of the conductors into the tab. Preferably such relative movement between the tab 52 and cable 3 is adequate to draw the signal conductor fully out from the tab leaving the conductor end **4*e* fully exposed while the ends 5*e*, 6*e* of the ground conductors remain within covering finger portions 53, 54** of the tab.

Figure 5D:
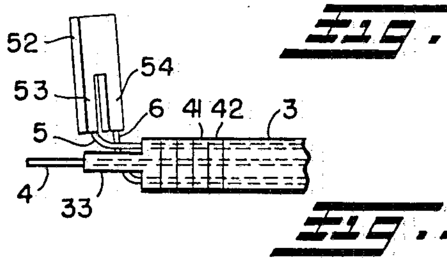

The insulation tab 52 is used to facilitate manipulation of the ground conductors to cross the exposed ground conductor end **6*e* under the exposed signal conductor end 4*e*. For that purpose, as is shown in FIG. 5D, the insulation tab 52 is rotated about 180° about an axis established by the ground conductor 5 such that the covering finger portion 54 passes into the plane of the drawing (relative to FIG. 5C); and at the same time the tab 52 is bent or twisted slightly to bend the ground conductor ends 5*e*, 6*e* to an offset position ready for attachment to the electrical contact. The ground conductor end 6*e* remains insulated from the signal conductor 4 by the insulation finger 33. Finally, the insulation tab 52 is removed from the ground conductor ends 5*e*, 6*e*, the signal conductor end 4*e* is bent into position for attachment to the electrical contact 8, and the junctions 30–32** with such contacts are made.

Although the aforesaid manipulation of the ground conductors may be effected manually without the facilitating use of the insulation tab 52, it will be appreciated that such manual manipulation would require more time and skill than the described operation. Additionally, although the insulation may be stripped without leaving the insulation finger 33 covering the signal conductor 4, it will be appreciated that such insulation finger assures electrical isolation between the signal conductor and the relatively crossed over (or under) ground conductor.

To prepare the cable 3 according to the steps illustrated in FIGS. 5A–5C, the wire stripping apparatus 50 includes a pair of relatively movable members or slitter blocks 60, 61 and a pair of relatively movable members or crimping blocks 62, 63, shown in FIGS. 6A–6D. In the preferred embodiment the lower block 61, 63 are fixed in the apparatus 50 and the upper blocks 60, 62 are movable vertically. Additionally, the crimping blocks 62, 63 are movable laterally or arcuately to effect lateral pulling of the cable 3 while the slitter block 60, 61 hold the tab 52 therein.

Figure 6A:
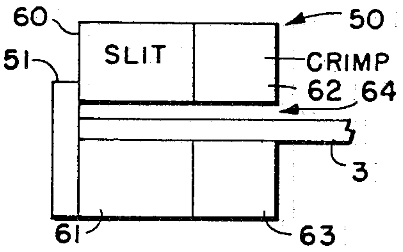
FIGS. 6A–6D are schematic illustrations of a machine in accordance with the invention and its manner of use for preparing the cable for use in a cable termination assembly.
Figure 6B:
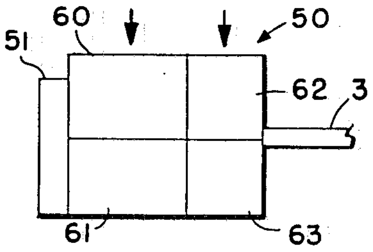
Figure 6C:
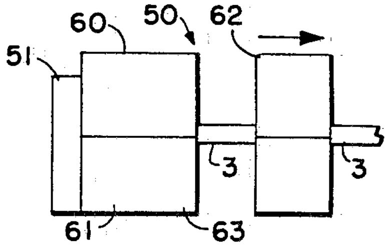
Figure 6D:
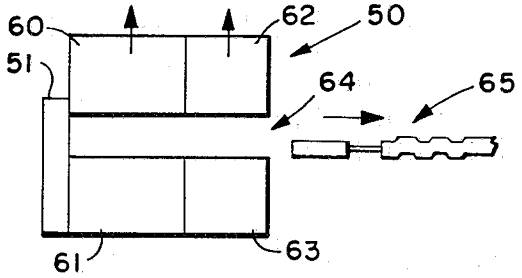

Looking at FIG. 6A the cable 3 is inserted into the space 64 between the upper and lower blocks to engage the end stop wall 51. Thereafter, both sets of blocks are closed, as is shown in FIG. 6B; at this time the slitter blocks 60, 61 slit the cable insulation accurately according to the desired pattern shown in FIG. 5B preferably without nicking the conductors and the crimping blocks 62, 63 crimp the raised and recessed wave pattern 40 into the cable. In FIG. 6C the crimping blocks are moved laterally while still securely holding the cable 3 therebetween and while the slitter blocks remain closed to hold the insulation tab 52 therein, thereby to pull the cable 3 away from the tab drawing the conductors into the latter a distance shown in FIG. 5C (the end 4e being exposed from the tab and the ends 5e, 6e remaining in the finger portions 53, 54). Finally, the slitter and crimping blocks are parted vertically and the prepared cable generally indicated at 65 in FIG. 6D is removed therefrom; also, the parted crimping block 62, 63 are returned laterally or arcuately to the position shown in FIG. 6D ready to prepare the next cable.

Turning now to FIGS. 7–13, the wire stripping apparatus or machine 50 is illustrated in greater detail. It has been discovered that to effect a clean slitting operation without ripping or tearing the insulation and without damaging the conductors of the cable 3, it is desirable that the several slitter blades of the slitter blocks be formed by the intersection of two surfaces, one of which is approximately vertical and the other of which intersects the latter at an angle of approximately 45°. Other angular relationships also may be used, if desired, keeping in mind, however, that slitting preferably should occur a maximum amount through the insulation while a fairly maximum support function is provided the cable and the slitter blades are ordinarily not permitted to nick or otherwise to touch the conductors in the cable.

Figure 7:
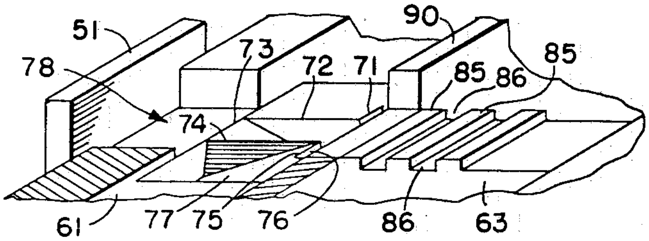
FIG. 7 is an isometric view, partly broken away in section, of the lower slitter block and crimping block of the machine in accordance with the invention, it being appreciated that the upper slitter and crimping blocks are of similar character.

Referring briefly to FIG. 7, the lower slitter block 61 includes five slitter blades 71–75, each being formed by a substantially vertical surface, such as surface 76 of slitter blade 75, and an angularly declining surface, such as the surface 77 associated with the slitter blade 75. The surfaces 76, 77 preferably meet along the line of the slitter blade 75 defining a cutting edge at an acute angle of approximately 45° therebetween. The slitter block 61 also includes a guide space 78 for guiding the cable 3 directly to abutting engagement with the end stop wall 51 and for guiding movement of the upper slitter block 60 with respect to the lower slitter block 61; the upper slitter block 60 accordingly has a downwardly extending guide tab, not shown, that fits closely in the guide space 78 for vertical movement therein. The upper slitter block 60 also has five slitter blades aligned directly above the slitter blades 71–75 of the lower slitter block 61.

Figure 12:
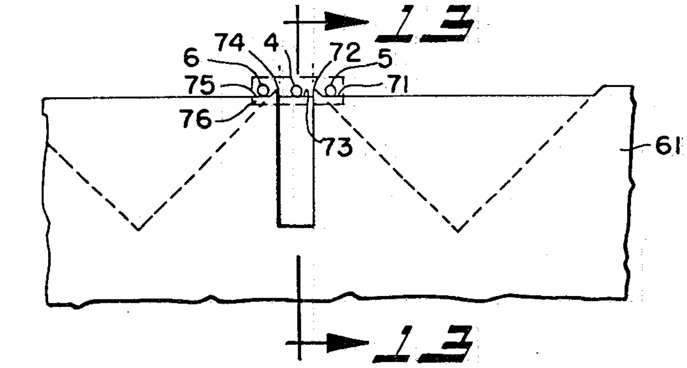
FIG. 12 is a front end view of the lower slitter block looking generally in the direction of the arrows 12—12 of FIG. 11.

The longitudinal slitter blades 72, 74, longitudinal meaning that they extend longitudinally parallel to the major directional extent of the cable and conductors, terminate in a common plane with each other and are intended to abut or nearly to abut the corresponding longitudinal slitter blades in the upper slitter block 60 when the two slitter blocks 60, 61 are closed to a maximum position. As is seen in FIG. 12 the longitudinal slitter blades 72, 74 of the lower slitter block 61 pass or slit about halfway through the cable 3 as do the longitudinal slitter blades of the upper slitter block 60. However, the plane in which the transverse slitter blades 71, 73, 75 of both the lower and upper slitter blocks 60, 61, transverse meaning that such slitter blades extend in a direction approximately transverse to the directional extent of the cable, is lower than or recessed relative to that in which the longitudinal slitter blades 72, 74 terminate so that such transverse slitter blades will slit only partly, i.e. less than halfway, through the insulation 7 without nicking the conductors therein.

Figure 10:
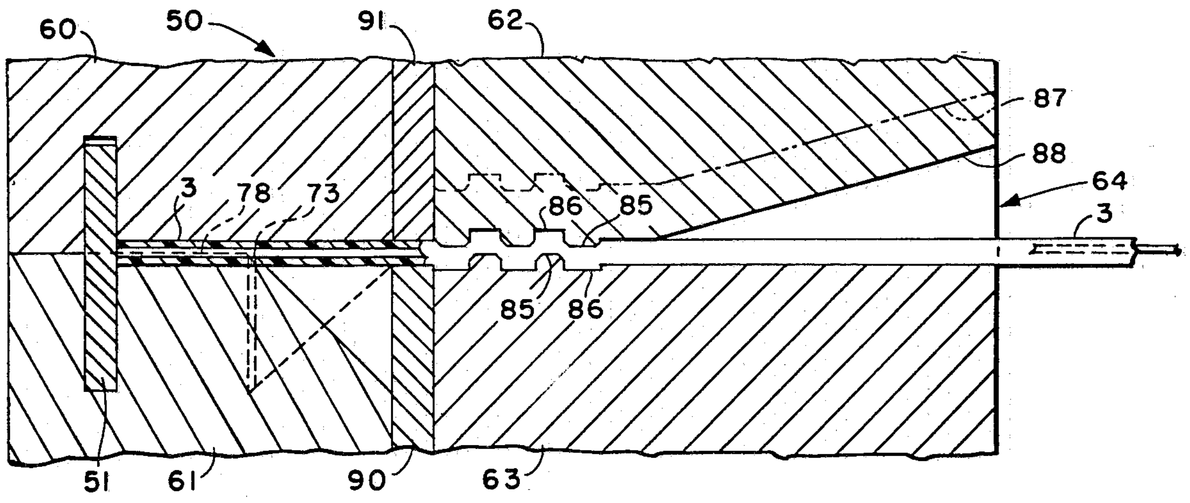
FIG. 10 is an elarged fragmentary view of the machine illustrating the slitter and crimping blocks.
Figure 11:
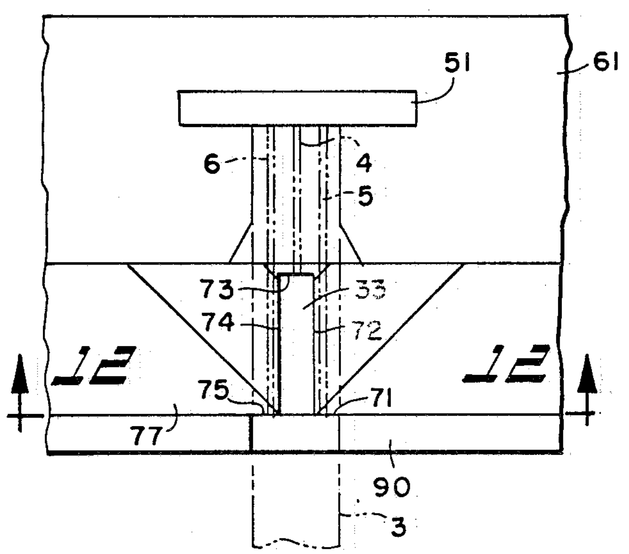
FIG. 11 is an enlarged plan view looking down on the top of the lower slitter block.
Figure 13:
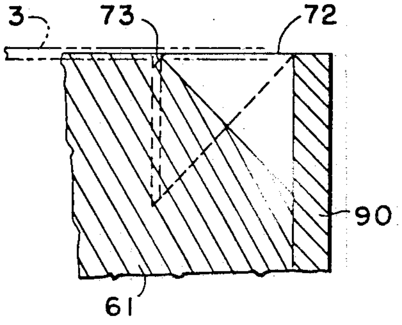
FIG. 13 is a section view of the lower slitter block looking generally in the direction of the arrows 13—13 of FIG. 12.

The crimping blocks 62, 63 have a plurality of crimping steps and recesses 85, 86 that mate with each other approximately to the closed position shown in solid line in FIG. 10 to crimp the cable 3 therebetween. With the upper crimping block 62 raised in the wire stripping apparatus 50 to the position shown at the phantom line 87 in FIG. 10, and the slitter block 60 also raised a similar amount, a tapered opening 88 guides the cable 3 into properly aligned position in the apparatus 50 to abutment with the end stop wall 51. The crimping blocks 62, 63 also have a wire guide wall 90, 91, which may be integral with or a separate part from the respective crimping blocks to guide the cable into proper alignment in the slitter blocks.

Figure 8:
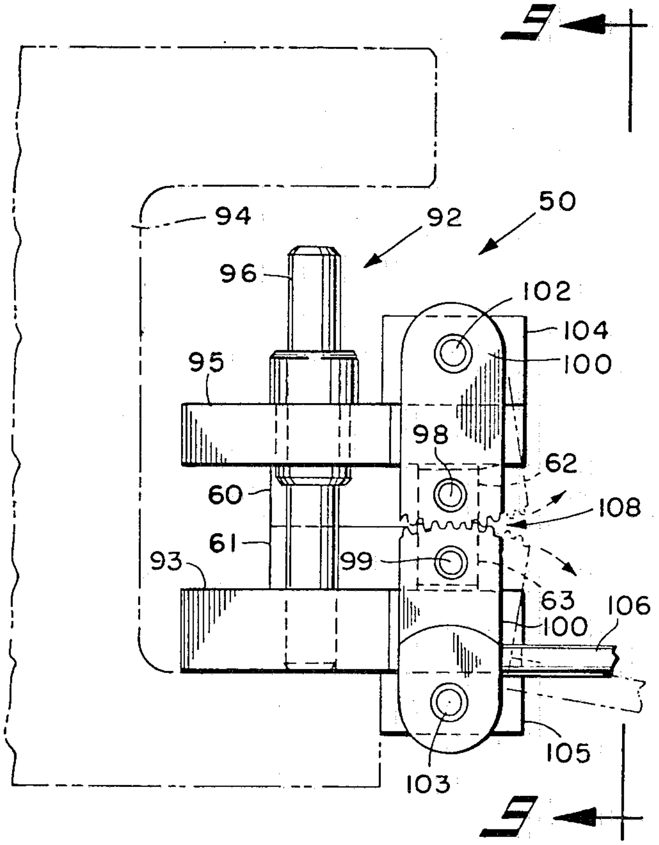
FIG. 8 is a side elevation view of an arbor press machine in accordance with the invention employing the slitter and crimping blocks of FIGS. 6A–6D and 7 for preparing a cable for use in a cable termination assembly.
Figure 9:
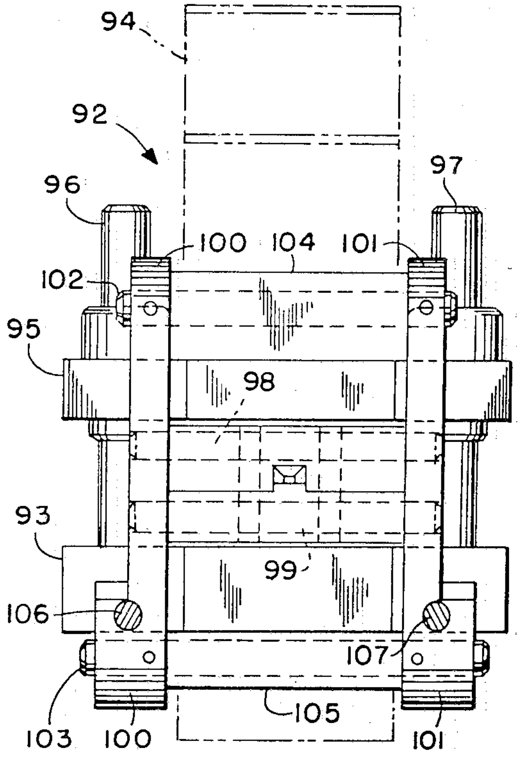
FIG. 9 is a front elevation view of the machine looking generally in the direction of the arrows 9—9 of FIG. 8.

Referring to FIGS. 8 and 9, the slitter and crimping blocks 60–63 are mounted in an arbor press 92. The lower slitter block 61 is relatively fixedly mounted in a base 93, which is in turn attached to the frame 94 of the arbor press. The upper slitter block 60 is mounted in a base 95, which is movable vertically on a pair of posts 96, 97 fixed in the base 93 in conventional manner. The crimping blocks 62, 63 are pivotally mounted by pins 98, 99 in geared arms 100, 101 preferably at both sides of the apparatus 50, and the geared arms are mounted, respectively, by pins 102, 103 in extension portions 104, 105 attached to the respective bases. A pair of handles 106, 107 extend outwardly from the arms 100, 101, and a return spring, not shown, preferably normally urges the arms 100, 101 and the handles to the positions shown in solid lines in FIGS. 8 and 9 such that the crimping blocks 62, 63 are in abutment with the respective slitter blocks 60, 61 in the manner shown, for example, in FIG. 10. However, by applying a downward force on the handles 106, 107, the geared arms 100, 101 linked by their coupling gears generally designated at 108 rotate in a righthand direction relative to the illustration of FIG. 8 to move the crimping blocks 62, 63 also in a righthand direction thus pulling the cable to the right relative to the slitter blocks 60, 61 while the latter securely hold the insulation tab 52 therein. Also, a conventional handle operating mechanism, not shown, may be selectively operated to close the press 92 urging the base 95 toward the base 92 bringing the upper slitter and crimping blocks toward the lower ones, preferably with the longitudinal slitter blades of the upper and lower slitter blocks engaging each other, to slit and to crimp the cable 3 as was described above.

In view of the foregoing, it will be appreciated that the wire stripping apparatus 50 may be used to prepare a cable 3 for use in a cable termination assembly and the cable termination assembly may be used for electrical signal coupling purposes.

We claim:

1. A machine for preparing a cable for use in a cable termination assembly, such cable being of flat type including a plurality of conductors separated from each other an held in generally parallel and coplanar relationship by cable insulation, said machine comprising longitudinal slitter blade means for slitting the cable insulation between two relatively adjacent conductors of the cable in a longitudinal direction substantially parallel to such conductors, two transverse slitter blade means at respective longitudinal ends and transversely opposite sides of said longitudinal slitter blade means for slitting the cable insulation in a direction transverse to that of such conductors, said longitudinal and transverse slitter blade means operating to slit the cable insulation near an end of the cable to outline a tab of insulation at such end of the cable, and puller means for effecting relative longitudinal movement between the insulation tab and the conductors thereby to draw the ends of the conductors into such tab.

2. The machine of claim 1, wherein each slitter blade means includes a pair of opposed slitter blades relatively movable in a direction normal to the cable to slit the cable insulation.

3. The machine of claim 2, comrising a pair of opposed slitter members relatively movable in a direction normal to the cable, one slitter member including one slitter blade of each pair thereof and the other slitter member including the other slitter blade of each pair thereof.

4. The machine of claim 3, wherein the slitter blades of said transverse slitter blade means terminate short of the slitter blades of the longitudinal slitter blade means in their respective slitter members in a direction normal to the cable to prevent the slitter blades of the transverse slitter blade means from nicking the conductors in such cable when said slitter members are brought to engagement with each other for slitting the cable insulation.

5. The machine of claim 3, wherein each slitter member includes a block in which the respective slitter blades are integrally formed.

6. The machine of claim 4, wherein each block has plural pairs of surfaces intersecting at an included angle of about 45° to form respective slitter blades therein.

7. The machine of claim 3, wherein said slitter members have a substantially identical pattern of slitter blades therein positioned in alignment with corresponding slitter blades in the other slitter member.

8. The machine of claim 1, wherein there are two of said longitudinal slitter blade means which are transversely spaced apart and longitudinally coextensive, and three of said transverse slitter blade means, one extending transversely between said two longitudinal slitter blade means at one end thereof and the other two respectively extending transversely outwardly from said two longitudinal slitter blade means at the other end thereof.

9. The machine of claim 1, wherein said puller means moves in a longitudinal direction substantiallly parallel to the conductors by a predetermined amount adequate to draw one of such relatively adjacent conductors fully out from the tab but not the other of such relatively adjacent conductors whereby the tab may be used to facilitate manipulation of the latter conductor.

10. The machine of claim 1, wherein said puller means includes deforming means for deforming plastically at least a portion of the cable insulation at a location spaced from such end of the cable.

11. The machine of claim 10, wherein said deforming means includes relatively movable members and means for moving the same with respect to each other to crimp a pattern of relatively raised and recessed portions in the cable insulation.

12. The machine of claim 11, wherein said relatively movable members include a pair of crimping blocks, each crimping block having a pattern of relatively raised and recessed areas aligned with each other in out of phase position.

13. The machine of claim 12, wherein at least one of said crimping blocks includes guide passage means for guiding a cable therethrough into alignment with said slitter means and deforming means.

14. The machine of claim 1, further comprising deforming means for deforming at least a portion of such insulation at a location spaced from such end of the cable.

15. The machine of claim 14, wherein said deforming means includes relatively movable members and means for moving the same with respect to each other to crimp a pattern of relatively raised and recessed portions in the cable insulation.

16. A machine for preparing a cable for use in a cable termination assembly, such cable including at least one conductor and insulation, said machine comprising slitter means for slitting such insulation near an end of such cable to define a tab of severed insulation at such end of the cable and to hold such tab of insulation at its severed end, crimping means for crimping a length of the cable insulation at a location spaced from such end of the cable to form at least one recess in the cable insulation and then to hold the cable at such recess, and means for moving said crimping means away from said slitter means a predetermined distance in a longitudinal direction parallel to the cable while the slitter means holds stationary the tab of insulation thereby to draw the end of the conductor into the tab of insulation.

17. The machine of claim 16, wherein said slitter means includes at least one slitter member including longitudinal slitter blade means for slitting insulation of such cable in a longitudinal direction substantially parallel to the conductor and transverse slitter blade means for slitting insulation in a direction transverse to that of the conductor.

18. The machine of claim 16, wherein said crimping means includes a pair of relatively movable members and means for moving the same with respect to each other to crimp a pattern of relatively raised and recessed portions in the cable insulation.

19. The machine of claim 18, wherein at least one of said movable members includes guide passage means for guiding a cable therethrough into alignment with said slitter means.

20. The machine of claim 16, wherein said crimping means includes a pair of relatively movable members and means for mounting said movable members for generally arcuate movement, and said means for moving includes means operable to move said movable members in respective generally arcuate paths.

21. A machine for preparing a cable for use in a cable termination assembly, such cable including at least one conductor and insulation, said machine comprising two pairs of blocks defining between the blocks of each pair a respective portion of a longitudinal slot for receiving the cable to be prepared, one pair of blocks including slitter blocks relatively movable in a direction normal to such longitudinal slot to slit the insulation at slitter blades therein near an end of the cable to define a tab of insulation at such end, and the other pair of blocks including crimping blocks relatively movable in a direction normal to such longitudinal slot to crimp the cable insulation at a location spaced from such end of the cable, and means for relatively moving said pairs of blocks a predetermined distance in a longitudinal direction parallel to the cable while the slitter and crimping blocks respectively hold the insulation tab and cable to draw the end of the conductor into such tab.

* * * * *